United States Patent [19]
Hellsten

[11] Patent Number: 6,072,420
[45] Date of Patent: Jun. 6, 2000

[54] ULTRA WIDE BAND COHERENT RADAR SYSTEM OPTIMISING THE RADIO INTERFERENCE DISCRIMINATION CAPABILITY

[76] Inventor: Hans Hellsten, Mutebo Aspnäs, SE-585 97 Linköping, Sweden

[21] Appl. No.: 09/125,828
[22] PCT Filed: Mar. 26, 1997
[86] PCT No.: PCT/SE97/00543
  § 371 Date: Sep. 2, 1998
  § 102(e) Date: Sep. 2, 1998
[87] PCT Pub. No.: WO97/36188
  PCT Pub. Date: Oct. 2, 1997

[30] Foreign Application Priority Data

Mar. 28, 1996 [SE] Sweden ................... 9601199

[51] Int. Cl.⁷ ............... G01S 13/22; G01S 13/24
[52] U.S. Cl. ............................ 342/25; 342/137
[58] Field of Search ................. 342/25, 21, 137

[56] References Cited

U.S. PATENT DOCUMENTS

| | | | |
|---|---|---|---|
| 4,907,000 | 3/1990 | Tabourier | 342/84 |
| 5,381,151 | 1/1995 | Boles et al. | 342/21 |
| 5,446,461 | 8/1995 | Frazier | 342/22 |
| 5,467,091 | 11/1995 | Watkins et al. | 342/159 |
| 5,486,833 | 1/1996 | Barrett | 342/21 |
| 5,657,022 | 8/1997 | Etten et al. | 342/104 |

FOREIGN PATENT DOCUMENTS

| | | |
|---|---|---|
| 2 412 852 | 7/1979 | France . |
| 2 573 540 | 5/1986 | France . |
| 2 710 417 | 3/1995 | France . |

*Primary Examiner*—Daniel T. Pihulic
*Attorney, Agent, or Firm*—Jacobson, Price, Holman & Stern, PLLC

[57] ABSTRACT

The present invention relates to an ultra wide band coherent radar system assessing the Doppler shift of the returned radar echoes, which radar system optimises the radio interference discrimination capability. The radar system comprises a control unit by which the transmit-receive process is partitioned into a number of consecutive sub-processes each of which consists of transmission followed by reception of a signal having a relative bandwidth of a fraction of an octave and where the received signals from the different narrow band transmissions are used to reconstruct broad band radar data by pulse compression techniques. Further, the control unit is arranged to determine the recurrence time, i.e. the time lapse between two consecutive transmissions, of a narrow band signal for a certain frequency step to be approximately inversely proportional to the frequency of this step and higher or equal to the Nyquist rate with respect to the Doppler bandwidth at this frequency.

12 Claims, 5 Drawing Sheets

ULTRA WIDE BAND COHERENT RADAR SYSTEM OPTIMISING THE RADIO INTERFERENCE DISCRIMINATION CAPABILITY

FIELD OF THE INVENTION

The present invention relates to an ultra wide band coherent radar system assessing the Doppler shift of the returned radar echoes, which radar system optimises the radio interference discrimination capability. The invention has arisen during the design of low frequency ultra wide band—UWB—SAR radars. It is, however, possible to apply the invention in UWB radar systems working at other frequencies and of other design, as long as they are coherent radar systems assessing the Doppler shift of the radar echo, which is obvious to a man skilled in radar technology. The invention will in the following be described based on the mentioned low frequency UWB SAR concept.

DESCRIPTION OF THE RELATED ART

The term ultra wide band—UWB—implies that the radar operates with a radar signal relative bandwidth of the order of one octave or larger. Thus range resolution will be of wavelength order. Low frequency is understood in the sense that the frequency is below the microwave frequencies mostly used by radars. Since frequencies below the microwave region are adopted generally for telecommunication, the problem of interference with telecommunication signals arises. The invention more specifically lays down a radar design in which the pattern of radar signal transmission and reception has the specific purpose of allowing cohabitation between radar operation and ongoing telecommunication services in the same frequency band.

The primary conceived embodiment of the invention is in a radar aircraft moving above the earth surface for the purpose of obtaining wavelength resolution radar images of the ground. The images are obtained by a signal processing technique known as synthetic aperture radar—SAR. The requirement of wavelength resolution is in this context considered a merit in its own, reducing the SAR image noise independently of resolution. Thus one may improve SAR image quality at a given resolution by reducing the frequency thus diminishing the ratio between spatial resolution and wavelength. Therefore shifting frequencies down into the telecommunication band is of interest.

While UWB signals provides wavelength range resolution, a similarly high cross range resolution calls for a radar antenna which collects signals over a wide aspect angle interval (beamwidths in the regime 30°–130°). The combination of large relative bandwidth and a wide aspect interval for data collection enables the wavelength limit for resolution to be approached, as has been successfully demonstrated in the CARABAS system for instance.

The fundamental limitation of microwave radar performance is set by thermal noise with which the radar signal has to compete. For low frequency radars, operating in all but extremely remote areas of the world, performance is not limited by thermal noise but by man-made radio frequency interference—RFI—white will be highly abundant below 1 GHz. The statistical character of RFI is entirely different from the Gaussian statistics of thermal noise.

Radio traffic signals (in which term here also television broadcast signals are incorporated), which are the cause of the RFI, invariably appear with bandwidths much smaller than the bandwidth used by the radar. For pure radio signals the bandwidth may be as narrow as 1 kHz. Television signals are much more broad band but are still narrow band compared to the radar bandwidth.

At frequencies above the short wave bands, i.e. above say 20 MHz, the radio traffic signals normally stem from nearby and sometimes line-of-sight radio transmitters. The received radar signal, which is the echo from the ground of the preceding transmit radar signal, is typically many orders of magnitude weaker than these radio signals. Therefore the bands used by radio traffic are not usable for the radar, though only some percentage of the radar band would actually be occupied by RFI and thus unusable. However in order to enable the void frequencies to be fully exploited the requirements on radar reception linear dynamic range are extreme.

SUMMARY OF THE INVENTION

Figure 1:
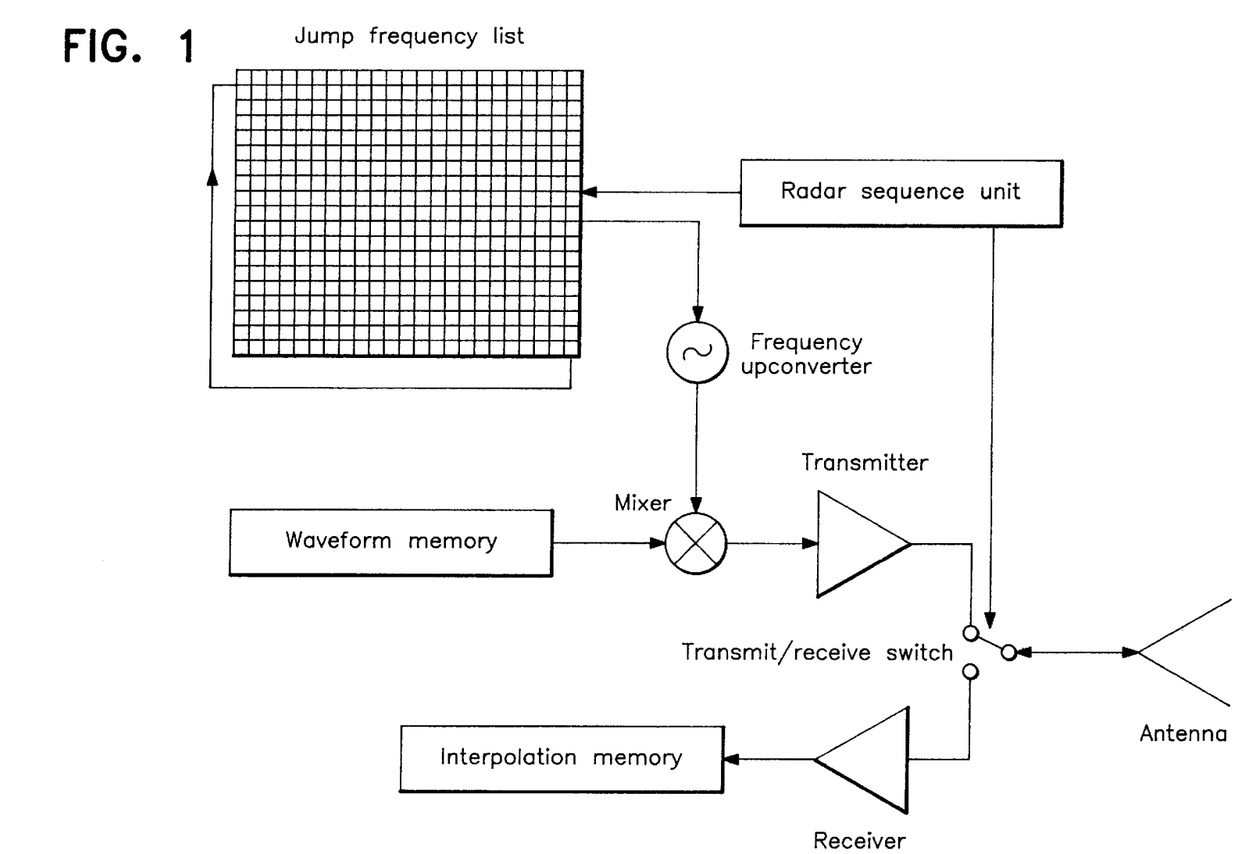
FIG. 1 shows one embodiment of a radar according to the invention.

The required radar performance is achieved essentially by two design steps. A schematic diagram of a radar built on these principles is shown in FIG. 1.

The first step is to subdivide the broad band transmit-receive process into a number of sub processes each of which consists of transmission followed by reception of a signal which span some fraction $B_{step}$ of the full bandwidth B. In this way the requirement on dynamic range of the recorded data is considerably reduced because only a fraction of the full RFI environment has to compete with the radar signal at any instant. At the same time according to the Nyquist sampling criterion the received signal can be sampled at slower rate because its bandwidth is reduced. Typically an AD converter operating with 14 bits of precision at 5 MHz sampling rate may be used, whereas each frequency step may span 2 MHz of bandwidth.

If RFI invariably were narrow band, it could be modelled as a set of sinusoids during the time interval of radar reception. It would then be possible to filter out RFI by subtracting radar data by sinusoids matched to the RFI. This is in fact a common method of RFI filtering. However RFI may also be considerably more broad band and thus assume forms that cannot be modelled as a discrete set of sinusoids. In order to deal with all forms of RFI, the receive time must be of the order of a millisecond so that the achieved spectral resolution is comparable with the minimum bandwidth 1 kHz of RFI. Then RFI can be removed by bandstop filtering with 1 kHz resolution bandwidth in the Fourier spectrum of the received signal, where the bandstop filters fully adapts to and covers the RFI sources irrespective of whether these are narrow or more broad band.

Correspondingly the second design step is to optimise the duration of each frequency step. An ultimate limit on reception time is set by the recurrence time for each frequency step which must be sufficiently short that the backscattered signal should be sampled at the Nyquist rate with respect to the Doppler bandwidth. Satisfying this criterion the radar data define a function $g(r,Q)$ where r denotes range and Q is any point on the radar aircraft track. The spatial bandwidth of the function in the parameters r and Q is given by the overall bandwidth B spanned by the frequency step sequence.

As for the interpolation, radar data available for each frequency step consist of a signal $g(v_{m_n}, r, Q_n)$, where $Q_n$, n=1,2, ... is the set of aircraft positions in the continuing process of frequency stepping. Here, $v_m$ denotes the frequency of each step and $m_n$ is the frequency step list. It is assumed that the signal has been formatted as a pulse compressed IQ (i.e. complex zero carrier) signal. Consider for an arbitrary aircraft position Q and an arbitrary frequency step $v_{m_n}$ the two adjacent positions $Q_n, Q_{n+N}$ for transmission of the frequency $v_{m_n} = v_{m_{n+N}}$. Because $g(v_{m_n}, r, Q_n)$ is well sampled with respect to Q, zero or first order interpolation will define $g(v_{m_n}, r, Q)$ with reasonable accuracy. Adopting first order linear interpolation we obtain $$g(v_{m_n}, r, Q) \equiv \qquad \text{Equation 1}$$

$$\frac{|QQ_n|}{|Q_n Q_{n+N}|} g(v_{m_n}, r, Q_n) + \frac{|QQ_{n+N}|}{|Q_n Q_{n+N}|} g(v_{m_{n+N}}, r, Q_{n+N}),$$

where |QP| denotes distance between any two vehicle positions. Assume that $M = B/B_{step}$ steps covers the step sequence spectrum. Upconverting and adding the signals $g(v_{m_n}, r, Q)$, the full compressed signal is given by the formula $$g(r, Q) = \sum_{m=1}^{M} e^{i v_m r} g(v_m, r, Q). \qquad \text{Equation 2}$$

The Doppler bandwidth for a wide beam radar is $4V/\lambda$, where V is aircraft ground speed, and $\lambda$ the radar wavelength. Because the Doppler bandwidth decreases with frequency, at lower frequencies the recurrence time will be longer. At the same time for a lower center frequency of the radar system, the system bandwidth will be smaller for a given relative bandwidth so fewer frequency steps are required. Therefore, adopting low frequencies for a UWB radar, the duration of each frequency step can be made longer. As mentioned, the ideal duration of each frequency step is of the order of a millisecond. The low frequency UWB SAR radar CARABAS, for instance, operates in the frequency regime 20–80 MHz, providing two octaves of bandwidth with the lowest frequencies just above the long distance short wave radio traffic. Hence circa 30 frequency steps of 2 MHz bandwidth are required to span the full band. Doppler bandwidths will vary in the interval 25–100 Hz, given a typical aircraft ground speed of circa 100 m/s. Typical recurrence times and thus in the order of tens of milliseconds, while the dwell time at each frequency step will be some fraction of a millisecond.

The first design technique mentioned of frequency stepping the radar is not new. However, the following step of non-sequential frequency jumping is a new technology and object of the present invention. To the problems discussed here it gives a solution by being designed as a coherent radar system for assessing Doppler shift of returned radar echoes which uses a radar signal having a relative bandwidth of more than one octave and which has a control unit for partitioning the transmit-receive process into a number of consecutive subprocesses, each of which includes transmission followed by reception of a signal having a relative bandwidth of a fraction of an octave and where the received signals from the different narrowband transmissions are used to reconstruct broadband radar data by pulse compression techniques. According to the present invention, a control unit sets the recurrence time, i.e., the time lapse between two consecutive transmissions, of a narrowband signal for a certain frequency step to be approximately inversely proportional to the frequency of this step and higher or at least equal to the Nyquist rate with respect to the Doppler bandwidth at this frequency. Advantageous embodiments of the invention include a SAR radar system comprising a vehicle moving over a planetary surface, means to repeatedly transmit radar signals from the vehicle to the surface and means to receive the echoes of the signals in the vehicle. In such a radar system, radar returns are stored for at least the recurrence time between two transmissions of the same frequency, and new and previous radar data are used to carry out an interpolation by which radar data $g(v_m, r, Q)$ become a function of step frequency $v_m$ and range r for any given set of points Q along the vehicle path, irrespective of the fact that the sampling density along the vehicle path is different for the different frequencies stepped through. The interpolation is carried out according to the linear scheme shown in Equation 1, where |QP| denotes distance between any two vehicle positions, and where $Q_n$, $Q_{n+N}$ are two adjacent vehicle positions for which the same frequency in the frequency step sequence is accessed, i.e., $vm_n = vm_{n+N}$ while $vm_n$ not equal to $vm_{n+N'}$ for m, N, N' positive integers and $N' < N$. The radar system of the present invention may be further embodied such that the predefined step sequence is obtained by assigning to each frequency a timing function which runs at a rate proportional to the frequency, in which the frequency to be selected is determined by which timer exhibits the greatest value and where each timer is set to zero for the frequency selected for transmission. The predefined step sequence may be further defined to be part of a sequence which is selected according to the principle that, when repeated, the square sum of the maximum recurrence intervals for each frequency becomes minimum.

BRIEF DESCRIPTION OF THE DRAWINGS

The invention will in the following be described in detail with reference to the enclosed drawings, where.

DETAILED DESCRIPTION OF THE PREFERRED EMBODIMENTS

Assume that the step dwell time is $T_{step}$. Available receiver technology—in particular AD technology—restricts $B_{step}$ to circa 2 MHz under the extreme requirements on receiver dynamic range which were discussed previously. In order to suppress radio signals in both transmit and receive radar signals (both of approximately equal length) it is required that independently of what surveillance range is required $T_{step} \approx 10^{-3}$ s. Thus both $B_{step}$ and $T_{step}$ are frequency independent quantities, set by given circumstances. Consider now, given $B_{step}$ and $T_{step}$, what SAR image surface resolution $\Delta A$ and cross track range $x_{max}$ can be achieved.

If the SAR image extends to cross track ranges up to $x_{max}$, one must require $$T_{step} = \frac{4 r_{max}}{c} = \frac{4 x_{max}}{c} \frac{1}{\cos(\Delta \theta / 2)}. \qquad \text{Equation 3}$$

SAR operation requires a wide aspect angle $\Delta \theta$ for data collection. UWB SAR aerial resolution is related to $\Delta \theta$ according to an exact formula, see L. M. H. Ulander and H. Hellsten "A New Formula for SAR Spatial Resolution", A. E. Ü. Int. J. Electron. Commun., $$\Delta A = \frac{c}{(v_{\max} + v_{\min})\Delta\theta} \times \frac{c}{2(v_{\max} - v_{\min})}. \qquad \text{Equation 4}$$

Less exactly, the first factor is azimuth and the second factor is range resolution.

The given formulas affects frequency step recurrence time. The recurrence rate $1/T_\nu$, equal to the Doppler bandwidth adopted for processing, is set by the adopted aspect angle interval $$\frac{1}{T_\nu} = B_{Doppler} = \frac{4V}{c}v\sin(\Delta\theta/2). \qquad \text{Equation 5}$$

Hence for a beamwidth approaching 180° one has $1/T_\nu \approx 4V/\lambda$ as mentioned. The non-sequential step rate is the average recurrence rate across the frequency band times the number of steps required to span the full bandwidth $$\frac{1}{T_{step}} = \frac{2V}{c}\frac{v_{\max}^2 - v_{\min}^2}{B_{step}}\sin(\Delta\theta/2), \qquad \text{Equation 6}$$

This formula implies for an UWB system $$v_{\max} \approx \sqrt{\frac{c}{2V}\frac{B_{step}}{T_{step}}}. \qquad \text{Equation 7}$$

Even for large beamwidths, as a fairly good approximation of the resolution formula of Equation 4 applied to non-sequential stepping through Equation 6

$$\Delta A \approx \frac{Vc}{2}\frac{T_{step}}{B_{step}}. \qquad \text{Equation 8}$$

The formula demonstrates the conflict between the requirements for high resolution, low step bandwidth for the purposes of high dynamic range and low data rate, long step dwell time for the purposes of sharp RFI notching and large surveillance range.

For instance with V=100 m/s, $T_{step}=10^{-3}$s, and $B_{step}=2$ MHz, Equation 8 implies $\Delta A=7.5$ m². Unless a coarser resolution is accepted the upper frequency should be chosen $v_{max}\approx 100$ MHz according to Equation 7. Combining Equations 6 and 3

$$x_{\max} = \frac{cT_{step}}{4}\sqrt{1 - \left(\frac{c}{2V}\frac{B_{step}}{T_{step}(v_{\max}^2 - v_{\min}^2)}\right)^2}. \qquad \text{Equation 9}$$

It is seen that a long step dwell time and a small step bandwidth are advantageous from the viewpoint of cross track range, i.e. aerial coverage capacity. However this reduces resolution. In fact, in view of the resolution formula of Equation 9, step dwell time has to be sacrificed somewhat. Choosing $v_{max}$=80 MHz, $v_{min}$=20 MHz and, $\Delta\theta\approx 113°$ then $T_{step}=6\times 10^{-4}$s by Equation 6. Hence $\Delta A=1.5\times 2.5$ m² by Equation 8 and $x_{max}$=25 km by Equation 9.

For sequential stepping the recurrence rate across the adopted frequency band must be determined by the highest Doppler bandwidth, thus $$\frac{1}{T_{step}} = \frac{4V}{c}\frac{v_{\max}(v_{\max} - v_{\min})}{B_{step}}\sin(\Delta\theta/2), \qquad \text{Equation 10}$$

so for the sequential step rate, the formula corresponding to Equation 9 becomes $$x_{\max} = \frac{cT_{step}}{4}\sqrt{1 - \left(\frac{c}{4V}\frac{B_{step}}{T_{step}v_{\max}(v_{\max} - v_{\min})}\right)^2}. \qquad \text{Equation 11}$$

To achieve the same cross track range as for sequential stepping, choose $T_{step}=4.5\times 10^{-4}$s. Then according to Equation 10 $\Delta\theta\approx 88°$ which implies according to Equation 11 $x_{max}$=25 km. However, $\Delta A=2\times 2.5$ m², according to Equation 8, which is a coarser resolution compared to sequential stepping.

In summary then, sequential stepping seems advantageous both because resolution is improved at a given aerial coverage rate and integration time for RFI notching is improved. Note also that according to Equation 8 resolution is restricted to be at best of the order a few square meters if $B_{step}$ and $T_{step}$ are chosen to yield high performance RFI suppression. For wavelength resolution SAR imaging this requires meter wavelengths, i.e. essentially the choice of frequencies which has been discussed here.

The next task is to construct a frequency step sequence $v_m=v_{max}-B_{step}\times(m_n-1)$, $m_n$, n=0,1,2, . . . based upon the foregoing idea of non-sequential stepping. While frequency step recurrence intervals $T_{v_m}$ should be given by Equation 5 this relation can only be approximate because step dwell times $T_{step}$ are assumed fixed and frequency steps at certain frequency have to occur after a certain number N of frequency steps. Hence the step sequence should obey the rule $$v_{m_{n+N}} = v_{m_n}, \quad N = \frac{T_{v_m}}{T_{step}}, \qquad \text{Equation 12}$$

where N is an integer and $T_{v_m}$ are approximately given by Equation 5.

It would hardly be possible to derive any analytical expression for a step sequence with the property. Numerically an approximate sequence may be constructed by an algorithm which chooses frequency according to priority. The following precise principle is that each frequency step m is assigned a clock which measures the time $\Delta\tau_{v_m}$ lapsed since the time $t_n$ of last transmission at this frequency. Let each clock measure this time in a scale given by the recurrence time i.e.

$$\Delta\tau_m = (t - t_n)\frac{4V}{c}v\sin(\Delta\theta/2). \qquad \text{Equation 13}$$

In order that no frequency should be undersampled it is required that $\Delta\tau_m \leq 1$. For each new frequency step the frequency $v_m$ for which $\Delta\tau_{v_m}$ is maximum is consequently chosen.

Figure 2:
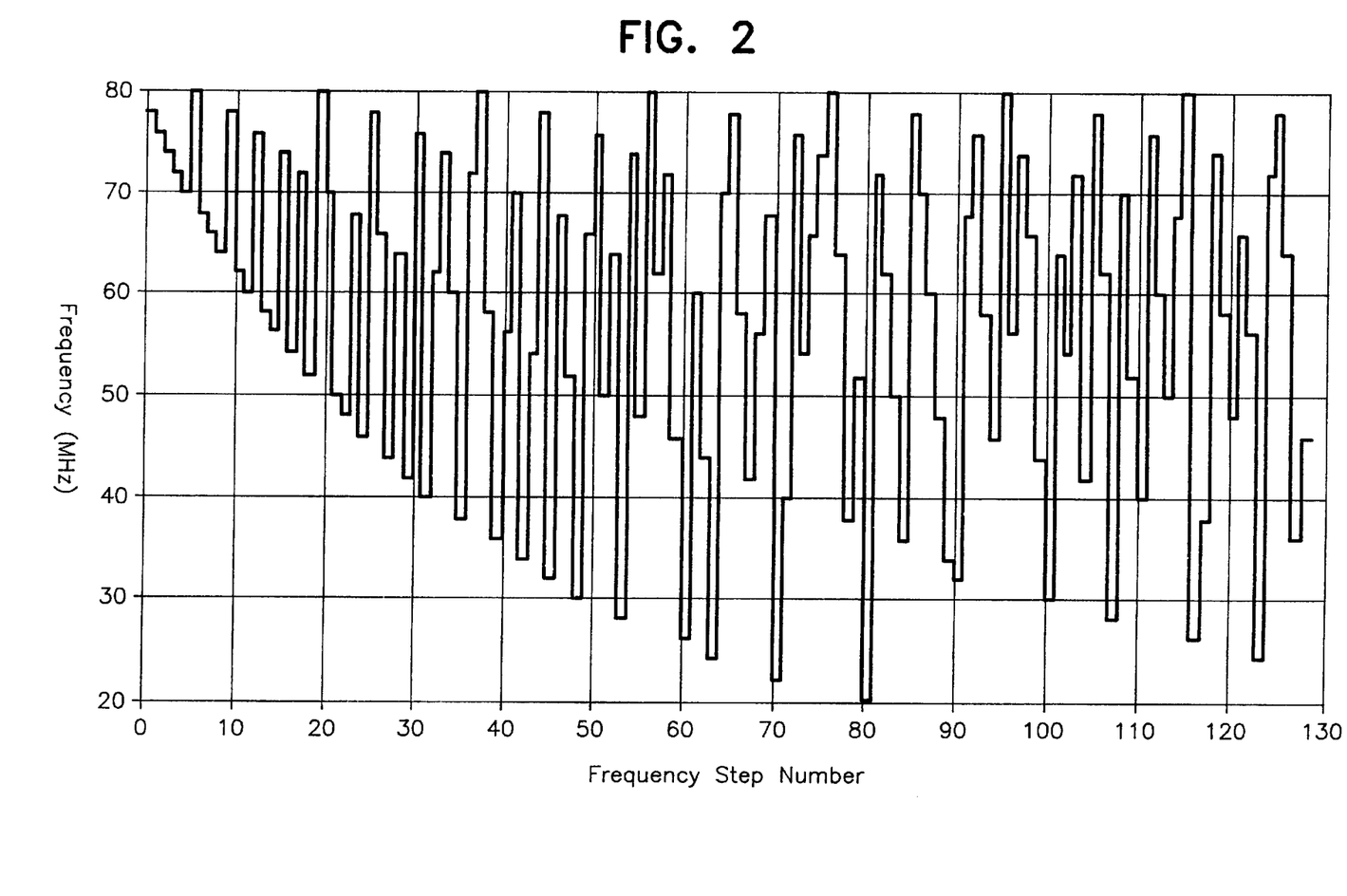
FIG. 2 shows the initial frequency steps of a step sequence according to the invention.

FIG. 2 depicts generation of a step sequence according to this method. The Figure shows the 130 initial steps for a 20–80 MHz band and 2 MHz of step bandwidth. The sequence starts at the highest frequency which initially corresponds to the maximum value of $\Delta\tau_{v_m}$. Frequencies are thereafter generated in a descending sweep, e.g. $m_0=1$, $m_1=2$, $m_2=3$, the decent being interrupted by occasional calls on higher frequencies since $\Delta\tau_{v_m}$ for these quickly regains maximum value after a setting to zero. Note that the second time a call is made on the highest frequency, the adjacent lower frequency will not follow immediately. In the figure $m_6=1$, $m_{10}=2$ for $B_{tot}=60$ MHz and $B_{step}=2$ MHz. In the frequency list the distance between the Nth generation of neighbouring frequencies will continue to increase as N increases. For instance the 30th passage of m=1, m=2 occurs at n=570 respective n=587 for $B_{tot}=60$ MHz and $B_{step}=2$ MHz. Finally a time t has lapsed which corresponds to N passages of 80 MHz but only N=1 passage of 88 MHz. This situation occurs when $$\frac{4V}{c}\sin(\Delta\theta/2)v_m t_{deg} = \frac{4V}{c}\sin(\Delta\theta/2)v_{m+1} t_{deg} - 1. \qquad \text{Equation 14}$$

Evidently this instant is one and the same for all frequencies and only depends on step bandwidth, i.e.

$$t_{deg} = \frac{c}{4V\sin(\Delta\theta/2)B_{step}}. \qquad \text{Equation 15}$$

Adopting Equation 6 this may be re-expressed in the number of frequency steps after such degeneration occurs $$N_{deg} = \frac{t_{deg}}{T_{step}} = \frac{v_{max}^2 - v_{min}^2}{2B_{step}^2}. \qquad \text{Equation 16}$$

Figure 3:
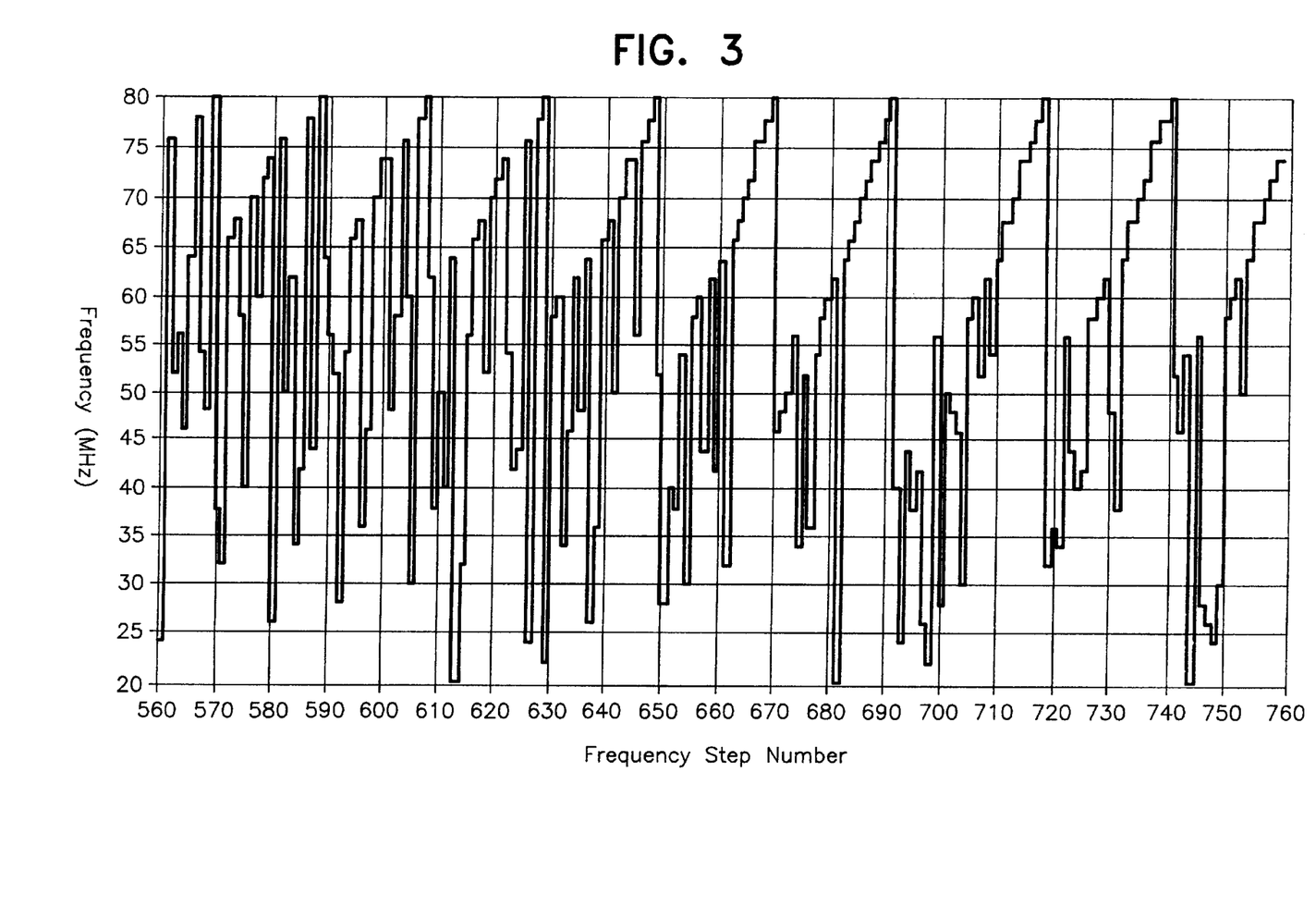
FIG. 3 shows the concluding frequency steps of the step sequence of FIG. 2.

For $v_{max}=80$ MHz, $v_{max}=20$ MHz and $B_{step}=2$ MHz one has $N_{deg}\approx 750$. At this number of steps the algorithm collapses since a conflict arises concerning priority for the transmission of different frequencies. Actually the (N−1)th generation of any frequency will not get the opportunity to pass to a time later than the Nth generation of the nearest higher frequency. The algorithm thus degenerates to approximately periodic frequency sweeps rising in frequency which do not efficiently obey the requirement on frequency dependent recurrence time. FIG. 3 shows the frequency steps 560–760 and illustrates the sequence as it approaches this degenerate case.

An algorithm is required which in the steady state situation generates a signal with recurrence time linearly dependent on frequency. This can be achieved approximately by interrupting and repeating the described finite frequency list an indefinite number of times. The sequence degenerates towards ascending sweeps as n approaches $N_{deg}$ while the sequence initially yields a monotonously descending sweep. Therefore a full length sequence would overrepresent the highest frequencies. As a sequence to be repeated, look for a subset $0<<N_0\leq n\leq N_1<<N_{deg}$ of the full sequence which yields the smallest amount of undersampling across the bandwidth as the sequence is repeated. This optimization is carried out numerically. Consider two consecutive sweeps each obtained by the discussed maximization of $\Delta\tau_{m_n}$. The total list consequently includes $2(N_1-N_0)$ elements. $N_1$ and $N_0$ is chosen so that the largest values of the intervals of Equation 13 (which can be expected to occur across the joint as the sequence is repeated) are maximally equal for all frequencies in the adopted band. Thus $N_1$ and $N_0$ is found as a solution to $$\min\sum_{m'}\max\{\Delta\tau_{m_n}^2; m_n = m', 0 \leq n \leq 2(N_1 - N_0)\}. \qquad \text{Equation 17}$$

Figure 4:
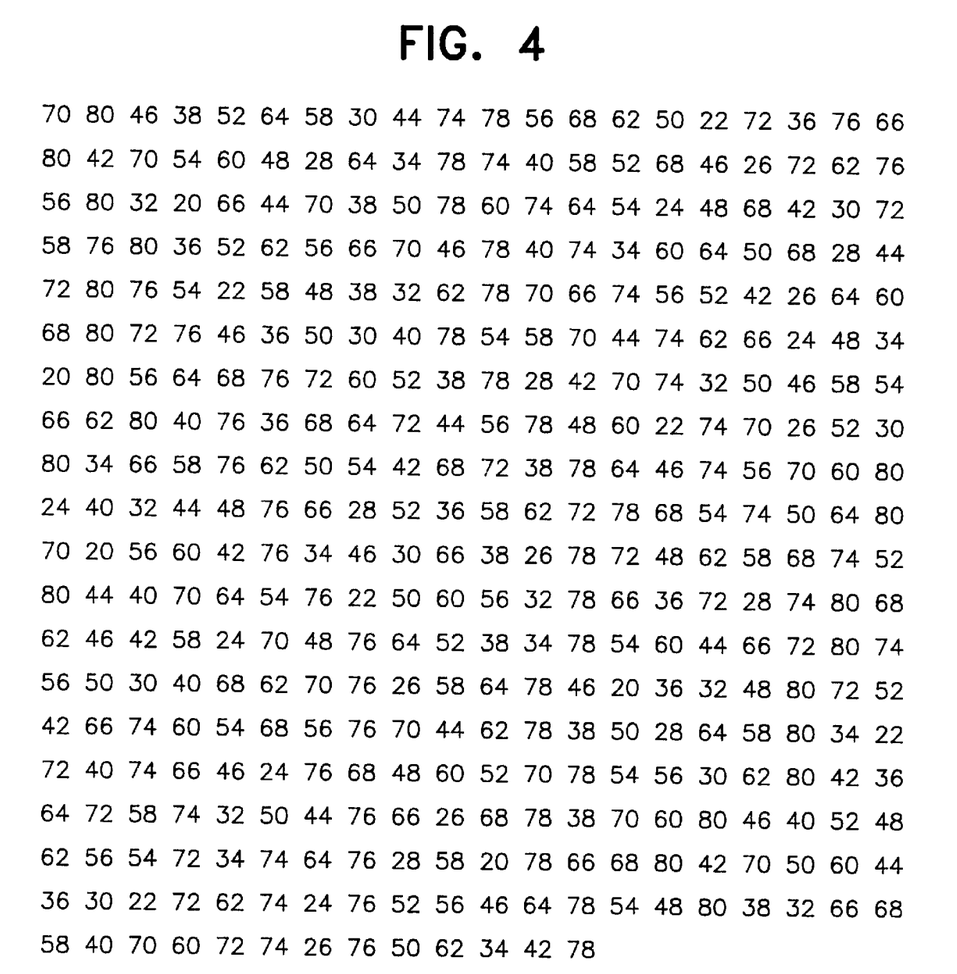
FIG. 4 shows an optimal frequency step sequence (to be read rowwise) according to the invention.
Figure 5:
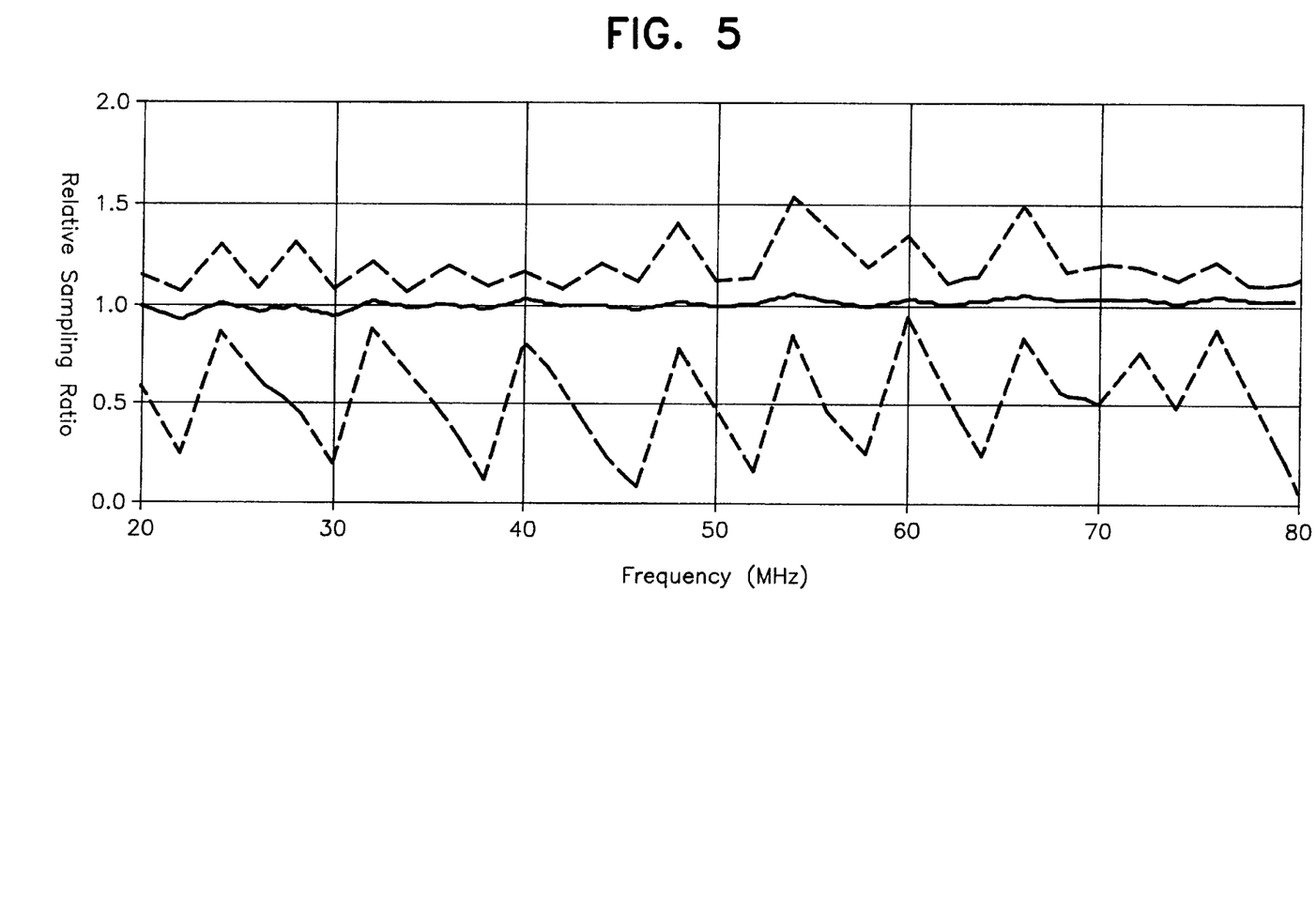
FIG. 5 shows mean (continuous) and max. and min. values (dotted) for $\Delta \tau_{v_m}$ as a function of frequency.

We test for this optimization all possible combinations of initial values $N_0$ and sequence length $N_1-N_0$, where $N_1$ is close to $N_{deg}$ but still sufficiently far away that degeneration has not yet become significant. Also $N_0$ should be sufficiently large that frequency jumps appears stochastic. FIG. 4 illustrates such a list of an optimal step frequency sequence (to be read rowwise) for $80\leq N_0\leq 200$ and $200\leq N_1-N_0\leq 400$ obtained at $N_0=195$ and $N_1-N_0=393$ for the 20–80 MHz band and 2 MHz step bandwidth. FIG. 5 depicts mean (continuous) and max. and min values (dotted) for $\Delta\tau_{v_m}$ as a function of frequency over repeated sequences and assuming $6\times10^{-4}$s step time and 113° beam width. The optimization minimizes the variance of the max. curve. Optimal variance is 0,0146. However Equations 13, 16 and 17 will uniquely determine such list for any choice of radar band and step bandwidth.

What is claimed is:

1. A coherent radar system assessing Doppler shift of returned radar echoes, which uses a radar signal having a relative bandwidth of more than one octave and which has a control unit by which the transmit-receive process is partitioned into a number of consecutive sub-processes, each of which includes transmission followed by reception of a signal having a relative bandwidth of a fraction of an octave and where received signals from different narrow band transmissions are used to reconstruct broad band radar data by pulse compression techniques, wherein the control unit sets a recurrence time, defined as a time lapse between two consecutive transmissions, of a narrow band signal for a certain frequency step such that said recurrence time is approximately inversely proportional to a frequency of the step and is at least equal to the Nyquist rate with respect to a Doppler bandwidth at the frequency, whereby the recurrence time is larger at lower frequencies than at higher frequencies.

2. The radar system according to claim 1, wherein the radar system is a SAR radar system comprising a vehicle moving over a planetary surface, means to repeatedly transmit radar signals from the vehicle to the surface and means to receive the echoes of said signals in the vehicle.

3. The radar system according to claim 2, wherein radar returns are stored for at least the recurrence time between two transmissions of a same frequency, and wherein new and previous radar data are used to carry out an interpolation by which radar data $g(v_m, r, Q)$ become a function of step frequency $v_m$ and range r for any given set of points Q along the vehicle path, even though sampling density along the vehicle path is different for different frequencies stepped through in a predefined frequency step sequence.

4. The radar system according to claim 3, wherein the interpolation is carried out according the linear scheme $$g(v_{m_n}, r, Q) \equiv \frac{|QQ_n|}{|Q_n Q_{n+N}|} g(v_{m_n}, r, Q_n) + \frac{|QQ_{n+N}|}{|Q_n Q_{n+N}|} g(v_{m_{n+N}}, r, Q_{n+N}),$$

where |QP| denotes distance between any two vehicle positions, and where $Q_n$, $Q_{n+N}$ are two adjacent vehicle positions for which the same frequency in the frequency step sequence is accessed, i.e. $v_{m_n}=v_{m_{n+N}}$ while $v_{m_n}, v_{m_{n+N'}}$ for m,N,N' positive integers and N'<N.

5. The radar system according to claim 3, wherein the predefined frequency step sequence is obtained by assigning to each frequency a timing function which runs at a rate proportional to the associated frequency, in which a frequency to be selected is determined by which timer exhibits a greatest value and where each timer is set to zero for the frequency selected for transmission.

6. The radar system according to claim 3 wherein the predefined frequency step sequence is defined as part of a sequence which is selected such that, when repeated, a square sum of maximum recurrence intervals for each frequency becomes minimum.

7. A coherent radar system for assessing Doppler shift of returned radar echoes, which uses a radar signal having a relative bandwidth of more than one octave and which has a control unit by which the transmit-receive process is partitioned into a number of consecutive sub-processes, each having a relative bandwidth of a fraction of an octave and where received signals from different narrow band transmissions within a frequency step sequence are used to reconstruct broad band radar data, wherein for each narrowband signal frequency within the frequency step sequence the control unit sets a time lapse between two consecutive transmissions as a recurrence time, said recurrence time being approximately inversely proportional to the narrowband signal frequency and at least equal to the Nyquist rate with respect to a Doppler bandwidth at the narrowband signal frequency, such that the recurrence time is larger at lower frequencies than at higher frequencies within the frequency step sequence.

8. The radar system as set forth in claim 7 wherein the frequency step sequence is non-sequential.

9. The radar system according to claim 7, wherein the radar system is a SAR radar system comprising a vehicle moving over a planetary surface on a vehicle path, means to repeatedly transmit radar signals from the vehicle to the surface and means to receive the echoes of said signals in the vehicle.

10. The radar system according to claim 9, wherein radar returns are stored for at least the recurrence time between two transmissions of a same frequency, and wherein new and previous radar data are used to carry out an interpolation by which radar data $g(v_m, r, Q)$ become a function of step frequency $v_m$ and range r for any given set of points Q along the vehicle path, with sampling density along the vehicle path being different different frequencies stepped through in the frequency step sequence.

11. The radar system according to claim 7, wherein the frequency step sequence is obtained by assigning to each frequency a timing function which runs at a rate proportional to the associated frequency, in which a frequency to be selected is determined by which timer exhibits a greatest value and where each timer is set to zero for the frequency selected for transmission.

12. The radar system according to claim 7, wherein the frequency step sequence is defined as part of a sequence which is selected such that, when repeated, a square sum of maximum recurrence intervals for each frequency is minimized.

* * * * *